July 26, 1966 W. H. HAYFORD, JR., ETAL 3,262,584

ARTICLE DISTRIBUTION AND STORAGE SYSTEM

Filed May 25, 1964 9 Sheets-Sheet 1

INVENTORS
WILLIAM H. HAYFORD, JR.
JOHN T. HAYFORD
JOHN F. GREEN
BY
ATTORNEY

July 26, 1966 W. H. HAYFORD, JR., ETAL 3,262,584

ARTICLE DISTRIBUTION AND STORAGE SYSTEM

Filed May 25, 1964 9 Sheets-Sheet 2

INVENTORS
WILLIAM H. HAYFORD, JR.
JOHN T. HAYFORD
JOHN F. GREEN
BY
Cyrus D. Samuelson
ATTORNEY July 26, 1966 W. H. HAYFORD, JR., ET AL 3,262,584

ARTICLE DISTRIBUTION AND STORAGE SYSTEM

Filed May 25, 1964

9 Sheets-Sheet 3

INVENTORS
WILLIAM H. HAYFORD, JR.
JOHN T. HAYFORD
BY JOHN F. GREEN

Cyrus D. Samuelson
ATTORNEY

ARTICLE DISTRIBUTION AND STORAGE SYSTEM

INVENTORS
WILLIAM H. HAYFORD, JR.
JOHN T. HAYFORD
JOHN F. GREEN
BY Cyrus D. Samuelson
ATTORNEY

ARTICLE DISTRIBUTION AND STORAGE SYSTEM

Filed May 25, 1964

INVENTORS
WILLIAM H. HAYFORD, JR.
JOHN T. HAYFORD
JOHN F. GREEN
BY Cyrus D. Samuelson
ATTORNEY July 26, 1966 W. H. HAYFORD, JR., ETAL 3,262,584

ARTICLE DISTRIBUTION AND STORAGE SYSTEM

Filed May 25, 1964 9 Sheets-Sheet 6

INVENTORS
WILLIAM H. HAYFORD, JR.
JOHN T. HAYFORD
JOHN F. GREEN

BY Cyrus D. Samuelson

ATTORNEY

July 26, 1966 W. H. HAYFORD, JR., ETAL 3,262,584

ARTICLE DISTRIBUTION AND STORAGE SYSTEM

Filed May 25, 1964 9 Sheets-Sheet 7

INVENTORS
WILLIAM H. HAYFORD, JR.
JOHN T. HAYFORD
JOHN F. GREEN
BY Cyrus D. Samuelson
ATTORNEY INVENTORS
WILLIAM H. HAYFORD, JR.
JOHN T. HAYFORD
BY JOHN F. GREEN
Cyrus D. Samuelson
ATTORNEY July 26, 1966 W. H. HAYFORD, JR., ETAL 3,262,584

ARTICLE DISTRIBUTION AND STORAGE SYSTEM

Filed May 25, 1964 9 Sheets-Sheet 9

INVENTORS
WILLIAM H. HAYFORD, JR.
JOHN T. HAYFORD
JOHN F. GREEN

BY Cyrus D. Samuelson

ATTORNEY 3,262,584

ARTICLE DISTRIBUTION AND STORAGE SYSTEM

William H. Hayford, Jr., Nutley, John T. Hayford, Midland Park, and John F. Green, West Milford, N.J., assignors to Unarco Industries, Inc., Chicago, Ill.
Filed May 25, 1964, Ser. No. 369,697
36 Claims. (Cl. 214—6)

The invention relates to article distribution and storage systems wherein a plurality of products may be stored, distributed and shipped in accordance with a predetermined, programmed scheme.

While the description of the invention will generally deal with filled shipping cases which are commonly formed of corrugated paper board, the invention may also be used for the storage and distribution of wooden cases and single wrapped or upwrapped articles.

In particular, the invention has for an important object the providing of a system for handling these shipping cases in any one of a number of different ways. Each case is filled with one particular product or combination of products and a plurality of products or product combinations are handled by the system. Depending upon the shipping requirements, product from the case filling area (input zone), packed in cases, may be moved by the system in any of the following ways:

(1) Product may be moved from the filling area in single case lots directly to the shipping area (output zone).

(2) Product may be fed from the case filling area, formed into tiers and moved in tier lots to a dense storage area where each product is formed into homogeneous stacks at predetermined locations.

(3) Product may be formed into tiers which are transferred to a pallet loading station to form a homogeneous pallet load or a pallet load may be formed of tier lots of different products. The filled pallet may then be placed on a pallet conveyor and moved to the shipping area.

(4) Tier lots of product may be transferred from the dense storage area to a pallet loading station to form a pallet load of tiers of several different products or of a single product. The filled pallet may be placed on a pallet conveyor and moved to the shipping area.

(5) Tier lots of one product may be transferred from one or more stations in the dense storage area to one or more unscrambling stations which break the tier lots into individual case lots which are fed in complete tier lots, partial tier lots or individual case lots onto a case conveyor for delivery to the shipping area.

(6) Tier lots of several products may be transferred from the dense storage area to a plurality of unscrambling stations which break the tier lots into individual case lots which are fed onto the case conveyor in accordance with the programmed demand. The desired combination of products in complete tier lots, partial tier lots or individual case lots may then be delivered to the shipping area by the conveyor.

(7) Product from the case filling area may be formed into tiers which are transferred to pallets to form homogeneous pallet loads. The filled pallets may be moved by conveyor or manually to a pallet storage area.

(8) Homogeneous pallet loads of different products from the pallet storage area may be depalletized on demand in a predetermined order of tier lots and placed on empty pallets on a pallet conveyor. The pallet loads thus formed on the pallet conveyor may contain full pallet loads or less than pallet loads made up of tiers of several different products or less than pallet loads of a single product. These filled pallets may then be delivered by the conveyor to the shipping area.

Each of a plurality of products in tier lots may be fed to its tier forming table from the case filling area. The finished tiers may be transferred to pallets, each of which is formed of a single product, and the filled pallets may be moved by a pallet conveyor to the shipping area. A tier lot equals the specific number of cases needed to form one layer, or tier, of a pallet load. This number will vary with the size of the case, the pattern chosen, and the size of the pallet.

It is a further object of the invention to provide a skewed roller conveyor for orienting cases to ensure that all the cases leaving the unscrambler have the same orientation prior to being fed to the case delivering conveyor.

It is a still further object of the invention to provide such a skewed roller conveyor wherein some of the rollers have different diameters and different surface characteristics and rotate at different velocities to ensure that the cases are properly separated and aligned on the conveyor.

It is a still further object of the invention to provide a a turning post which when used in conjunction with a case conveyor will, on demand, permit a case to retain its orientation with respect to the conveyor or will rotate the case 90° with respect to the conveyor.

It is a still further object to provide such a turning post whose rollers rotate when the case orientation is to be unchanged and are held from rotation when the case is to be rotated 90°.

It is still a further object to provide such a turning post whose roller rotation is controlled by a clutch and brake arranged so that the driving member runs all the time.

It is a still further object of the invention to provide a deflector mounted on the side of a conveyor to push selected cases from one plane of travel into one or more alternate parallel planes of travel on the same conveyor to assure proper tier formation.

It is a still further object of the invention to provide such a deflector having a long deflection blade for acting against a selected case and a small deflection blade for acting against other selected cases.

It is a still further object of the invention to provide the large deflection blade with an opening through which the small deflector may be moved so as to act against a transversely oriented case.

These and other objects, features, uses and advantages will be apparent during the course of the following description when taken in conjunction with the accompanying drawings wherein:

FIGURE 9 is a horizontal sectional view, taken along the lines 9—9 of FIGURE 8, viewed in the direction of the arrows;

Figure 1:
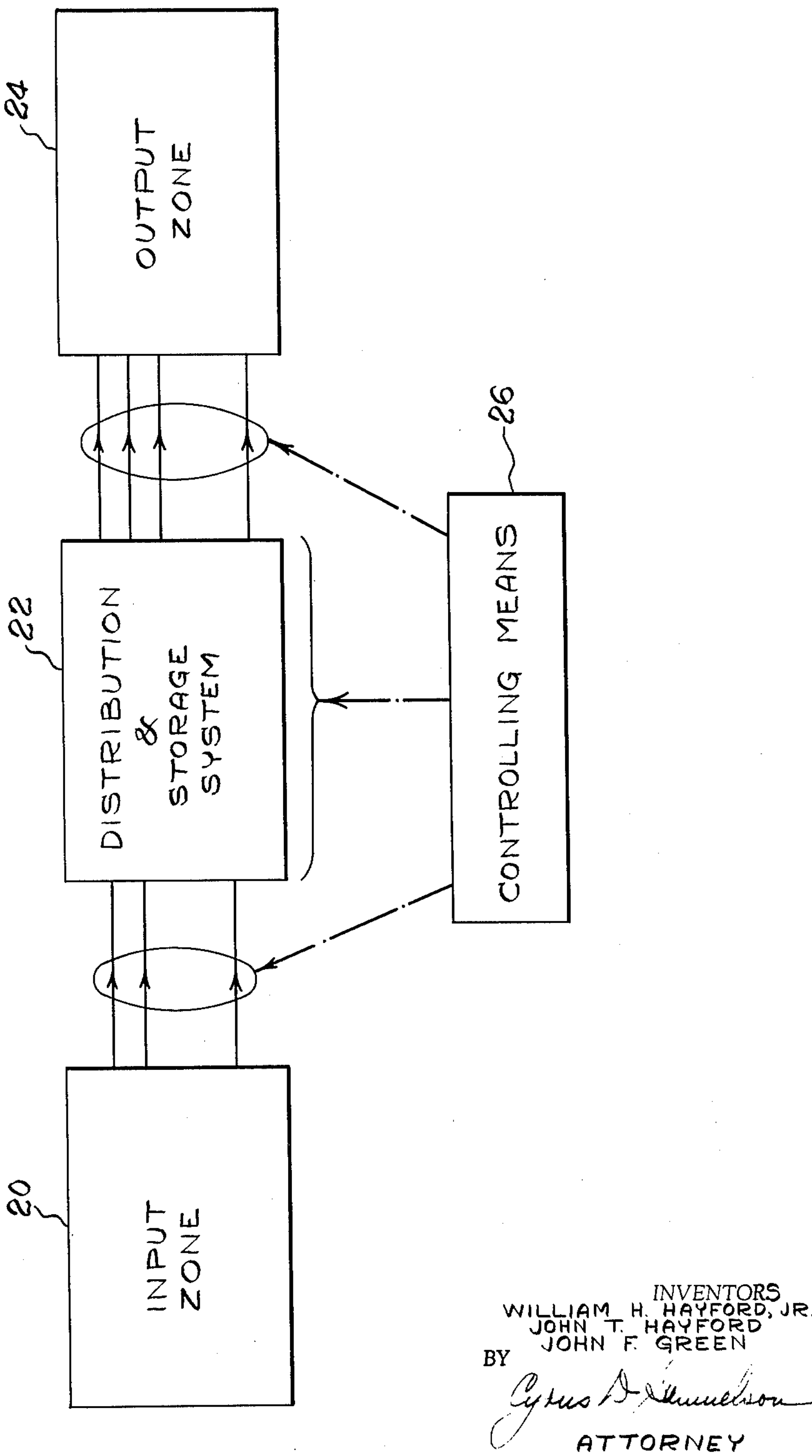
FIGURE 1 is a block diagram of the system of the invention.

In the drawings, wherein, there are illustrated a preferred embodiment of the system of the invention and preferred embodiments of the turning post, the skewed roller conveyor and the dual blade deflector used in the system of the invention, like numerals are used to designate like parts throughout the same.

Broadly, the invention is directed toward the distribution and storage of a plurality of products or articles in accordance with a prearranged plan or sequence. The prearranged plan or sequence includes the programming of the quantity and type of article to be processed within the system in any one of a number of ways. This programming can include the handling of individual cases (case lots), of a group of cases formed into a tier (tier lots), or of a group of tiers of cases stacked one upon the other on a pallet (pallet loads). The programming is also used to break tier lots into case lots (unscrambling) and to lift tier lots from pallets (depalletizing) and to remove tier lots from dense storage (tier picking).

In FIGURE 1 there is illustrated a block diagram of the system of the invention. Input zone 20 is commonly referred to as the packaging area. In this zone, in the case of food, for example, the food is prepared, packaged in cartons, plastic bags or other individual packages and the individual packages are packed in the corrugated shipping cases, boxes or bales. Normally, there is only a single type of product in each shipping case. However, a plurality of products may be packed in any given shipping case. For the purpose of illustration of the invention, it will be assumed that only a single product is packed in a given shipping case. It can easily be seen that the invention distributes and stores cases in accordance with a programmed sequence and cases containing more than one product may be handled by the system if desired.

There are a plurality of ways and means by which the filled cases are fed from the input zone 20 to the distribution and storage system 22. These ways and means are depicted schematically by means of the arrows between input zone 20 and distribution and storage system 22 (FIGURE 1). Output zone 24 is usually referred to as the shipping area and the cases are distributed to the output zone 24 from distribution and storage system 22 in a plurality of ways and means. These ways and means are depicted schematically by the arrows between distribution and storage zone 22 and output zone 24. The desired programming of the case handling is controlled by controlling means 26 which controls the feed from the input zone 20 to distribution and storage system 22 and the feed from distribution and storage system 22 to output zone 24. The controls are schematically shown by the dot and dashed arrows leading from controlling means 26 to the two sets of solid line arrows and to the distribution and storage system.

The controlling means may be a computer into which the desired distribution and storage data has been programmed by means of punched cards, punched tape, magnetic tape or typewriter and from which there is delivered the required signals needed to control the various operations necessary to the functioning of the invention in the desired manner. The controlling means is not limited to those set out just above and may be any system which will deliver signals capable of actuating the mechanisms of the distribution and storage system from any desired type of program information.

Figures 2, 3:
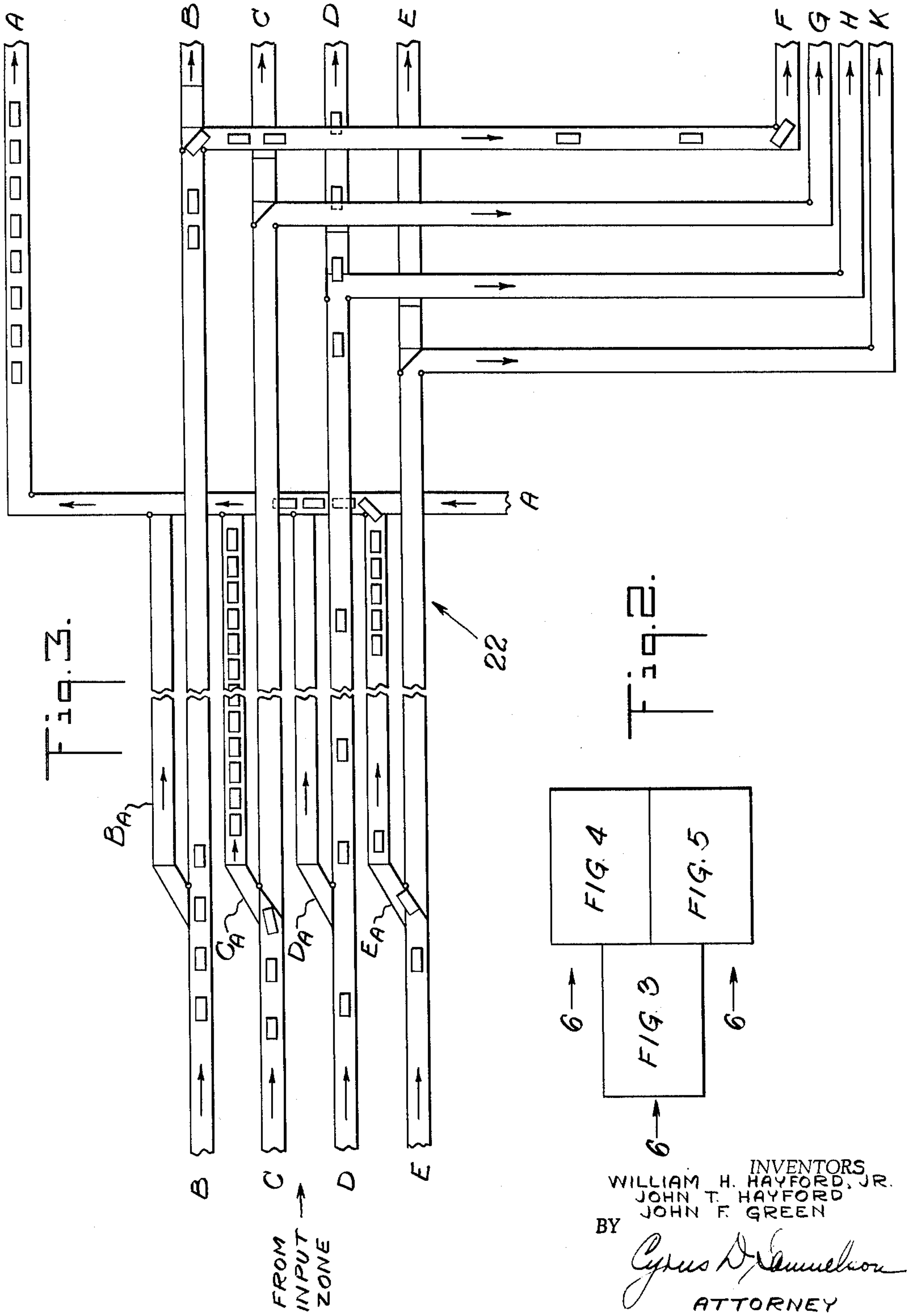
FIGURE 2 is a schematic diagram showing the relationship of the portions of the system illustrated in FIGURES 3, 4, 5 and 6.
FIGURE 3 is a diagrammatic plan view of the input of the system of the invention.

FIGURE 2 depicts the relationship of FIGURES 3 through 6 which illustrate the system of the invention. In FIGURE 3, four product lines are llustrated but it is within the contemplation of the invention to use more or less than the four product lines illustrated. A separate product is fed onto each product conveyor B, C, D, and E. If desired, products on each of the lines B, C, D and E may be fed straight through the system from the input zone 20 to the output zone 24. This is accomplished by programming the controlling means to deliver the filled cases as individual case lots on the straight-through conveyors B, C, D and E. The controlling means may also be programmed to deliver the product on line B straight through to the output zone and to treat the products on lines C, D and E in a variety of different manners.

Product from the four lines may also be fed into the single case conveyor A through the conveyors $B_A$, $C_A$, $D_A$ and $E_A$ which are controlled so that the desired number and types of cases are fed into conveyor A. In order to change the flow of product from the straight-through conveyors to conveyor A, a stop is raised on demand to interrupt the flow of product from the straight-through conveyor to the conveyor feeding conveyor A. These stops are well-known in the art and the details of their operation and construction are not shown. It will be seen how the product is handled by the system of the invention as this description proceeds. Product on conveyors B, C, D and E may also be fed to product line conveyors F, G, H and K respectively. This is accomplished by use of a stop similar to that used to divert product from the straight-through conveyors to conveyor A. Product line conveyors F, G, H and K differ from conveyor A in that conveyor A handles all the products fed from the input zone and conveyors F, G, H and K each handle a single product. The handling of the products fed onto conveyors F, G, H and K will be described further on in this specification.

Stops are also located at the intersections of feed conveyors $B_A$, $C_A$, $D_A$, and $E_A$ at the points at which they intersect with conveyor A. These stops are operated to control the flow into conveyor A so that a predetermined number and types of products are discharged onto conveyor A as required by the controlling means.

Figure 4:
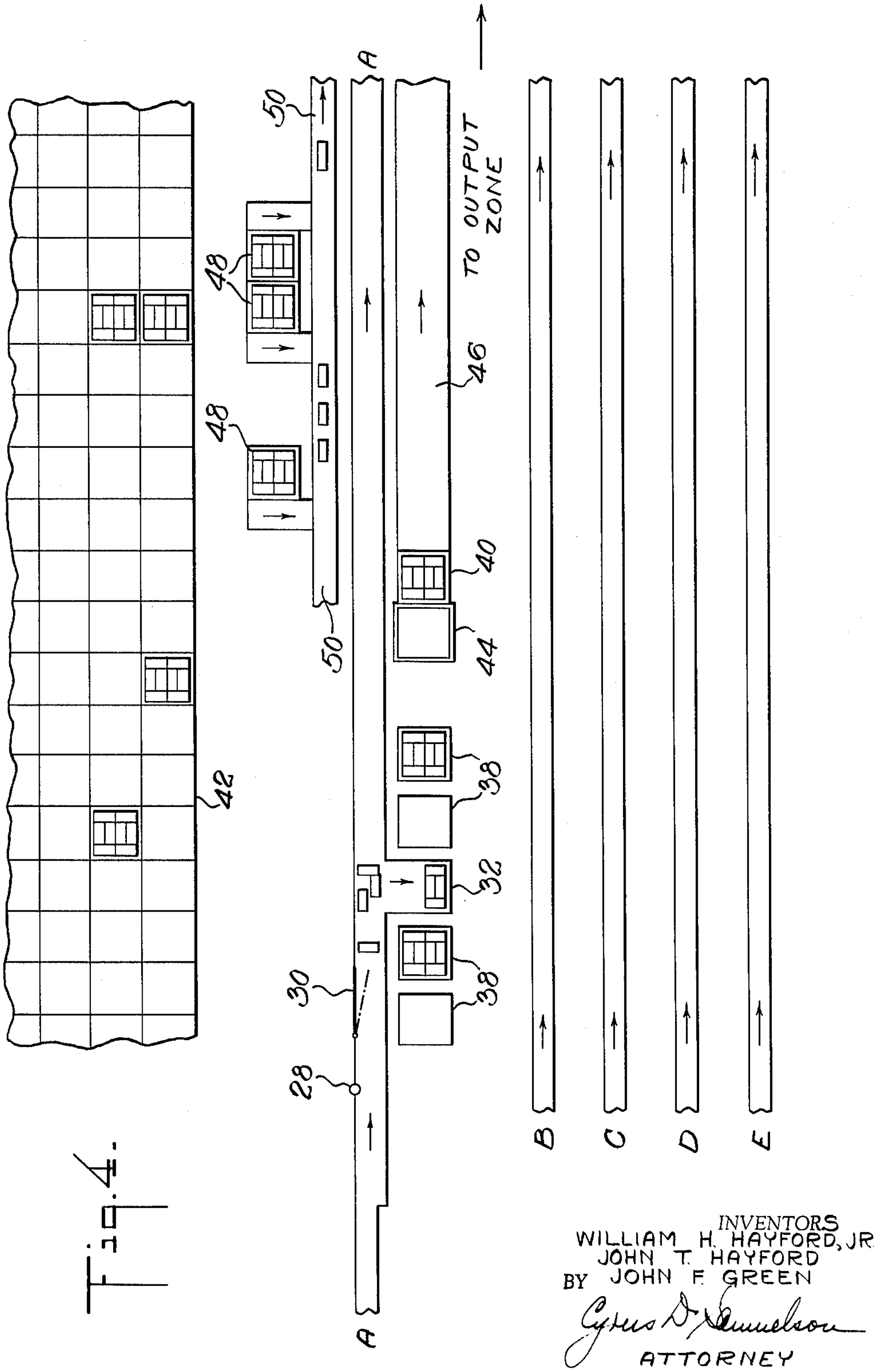
FIGURE 4 is a diagrammatic plan view showing the dense storage area, the tier forming table, pallet forming stations, tier unscrambling stations, a pallet conveyor and several case conveyors.

The product on conveyor A may be formed into tiers on one or more tier forming tables 32 or may be fed straight through to the output zone (FIGURE 4). Since conveyor A carries all the products rather than just a single product, it is possible to deliver case lots of the several products in the desired quantities and type by running conveyor A straight through to the output zone. While this is possible, it is not the usual employment of conveyor A. Turning post 28 is located on one side of conveyor A and is used to orient the cases so that they will be correctly aligned to form a tier pattern of the desired conformation. This is done so that alternate tiers can be interlocked and not contain long vertical, cleavage lines (column stacking) which tend to weaken the stack and cause the cases to fall over when several tiers are piled on a pallet or in a storage area.

Turning post 28 is constructed so that it turns the longitudinally oriented cases so that they are transverse to the direction of flow of the conveyor, or turns the transversely oriented cases so that they are longitudinally oriented or leaves the cases unturned. In the particular arrangement illustrated it turns longitudinally oriented cases to transverse orientation or leaves them unturned. The turning post 28 is operated on demand by means of a counter, photoelectric cell or similar device which is located close to the turning post and which has been programmed by the controlling means. The detailed construction and operation of the turning post will be described further on in this specification.

Deflector 30 is used to align the cases to prevent undesired rotation and to provide proper planar orientation for the cases being delivered to tier forming table 32 and is of the dual blade type. The details of its operation and construction will be described further on in this specification. The cases are fed from the conveyor A to tier forming table 32 in any manner well-known in the art and the details of this construction are not shown. As soon as a tier has been completely formed on tier forming table 32, a signal is sent to the suction lift 34 (FIGURE 6) which then proceeds along the overhead track 36 to a point over tier forming table 32. Suction lift 34 is not height sensitive. It drops down until it contacts the tier and then lifts the tier and transfers it to the location for which it is programmed. Suction lift 34 moves the tier from tier forming table 32 to pallets 38 or 40 or to a predetermined location in dense storage area 42. The suction lift controlling means counts the number of tiers it places on a particular pallet or in the station in the dense storage area so that the proper number of tiers for a given product are used to make up the pallet load or the storage load.

If the suction lift 34 is busy when the tier is formed on the tier forming table, the system controls are interlocked to stop the flow of cases from conveyor A onto tier forming table 32 or to divert the flow from conveyor A to another conveyor of the system. When a pallet 38 is completed to form a pallet load, the loaded pallet is removed manually or by a conveyor (not shown) and an empty one is put in its place either manually or automatically. In the meantime, the suction lift 34 will deposit another pallet load on an empty pallet at an alternate pallet station 38. Tier forming table 32 can handle more than one product and therefore, pallet loads of more than one product are formed on the pallets 38. Each pallet may contain just one product or it may contain a previously determined mixture of different product tiers.

Suction lift 34 is also used to stack predetermined pallet loads of the same product or differing tiers of products from tier forming table 32 onto pallet 40. An empty pallet is fed in the usual manner well-known in the art from pallet magazine 44 to the position of pallet 40 in FIGURE 4 and the pallet is filled as described above with respect to pallets 38. When the pallet load is completed, conveyor 46 is started and the filled pallet is moved toward the output zone. Pallet conveyor may be of the intermittent, indexed type or it may be a continuously running conveyor onto which the filled pallets are fed when desired.

It has been found preferable to pile the tier lots, which are stored in the dense storage area 42, on skids which keep the lowest tier off the floor. If desired, the first tier lot may be placed directly on the floor. These tier lots are closely spaced and the tiers are moved into and out of the dense storage 42 by means of the suction lift 34. Tiers formed on tier forming table 32 are placed in desired locations in the dense storage area 42 in such a manner as to keep the required rotation of product shipment. There can be more than one tier forming table 32 associated with conveyor A and there can be more than one overhead track 36 and suction lift 34 in operation at the same time depending upon the requirements of the particular installation.

Tier lots from particular, desired locations in the dense storage area 42 are brought out by one or more suction lifts and placed on unscrambling tables 48 on which the tier lots are broken into case lots and fed onto conveyor 50 in either tier lots, partial tier lots, or individual case lots of a particular product or mixed lots of a plurality of products. The detailed description of the construction and operation of the unscrambling tables and the conveyor 50 will appear further on in the specification.

It has been seen that the products delivered onto conveyor A can be distributed and stored in a number of ways and that this portion of the system of the invention is readily adapted to handle a plurality of products on that one single conveyor.

Up to now, the description has covered the handling of the plurality of products either by straight-through delivery to the output zone on conveyors B, C, D and E or by mixed processing from conveyor A. Conveyors B, C, D and E intersect with conveyors F, G, H and K respectively as indicated in FIGURE 3. Conveyors B, C, D, E and F, G, H and K have been shown disposed horizontally alongside each other but they may also be stacked vertically one above the other.

Each conveyor line F, G, H and K (FIGURE 5) is provided with a turning post 28 and a deflector 30 to orient the cases delivered to their associated tier forming tables 52. After the tier of cases is formed on the tier forming table 52, suction lift 54 which moves on overhead track 55 (FIGURE 6) transfers the tier to pallet station 56 into which an empty pallet has been fed from pallet magazine 58. A new pallet is fed to station 56 from magazine 58 whenever a filled pallet leaves station 56. The operation and construction of the pallet magazine are well-known in the art and will not be described in this specification. The filled pallets are moved in the direction of the arrows to position 59 and later onto pallet conveyor 60. The filled pallet loads are then moved to the output zone on conveyor 60.

Product is stored on movable pallets in pallet storage area 62 or other storage areas. These pallet loads have been transported there by either fork lift truck or by conveyors (not shown) from pallet stations 38 (FIGURE 4). The pallet loads made up at pallet stations 38 may contain one product or a plurality of products. Tier lots of product from the pallet storage area 62 are made up into pallet loads and placed on pallets on pallet conveyor 64. Empty pallets are indexed on demand from magazine 66 onto conveyor 64 and move intermittently, stopping in each instance directly before a pallet 63 from which a tier is to be transferred.

Figures 6, 7:
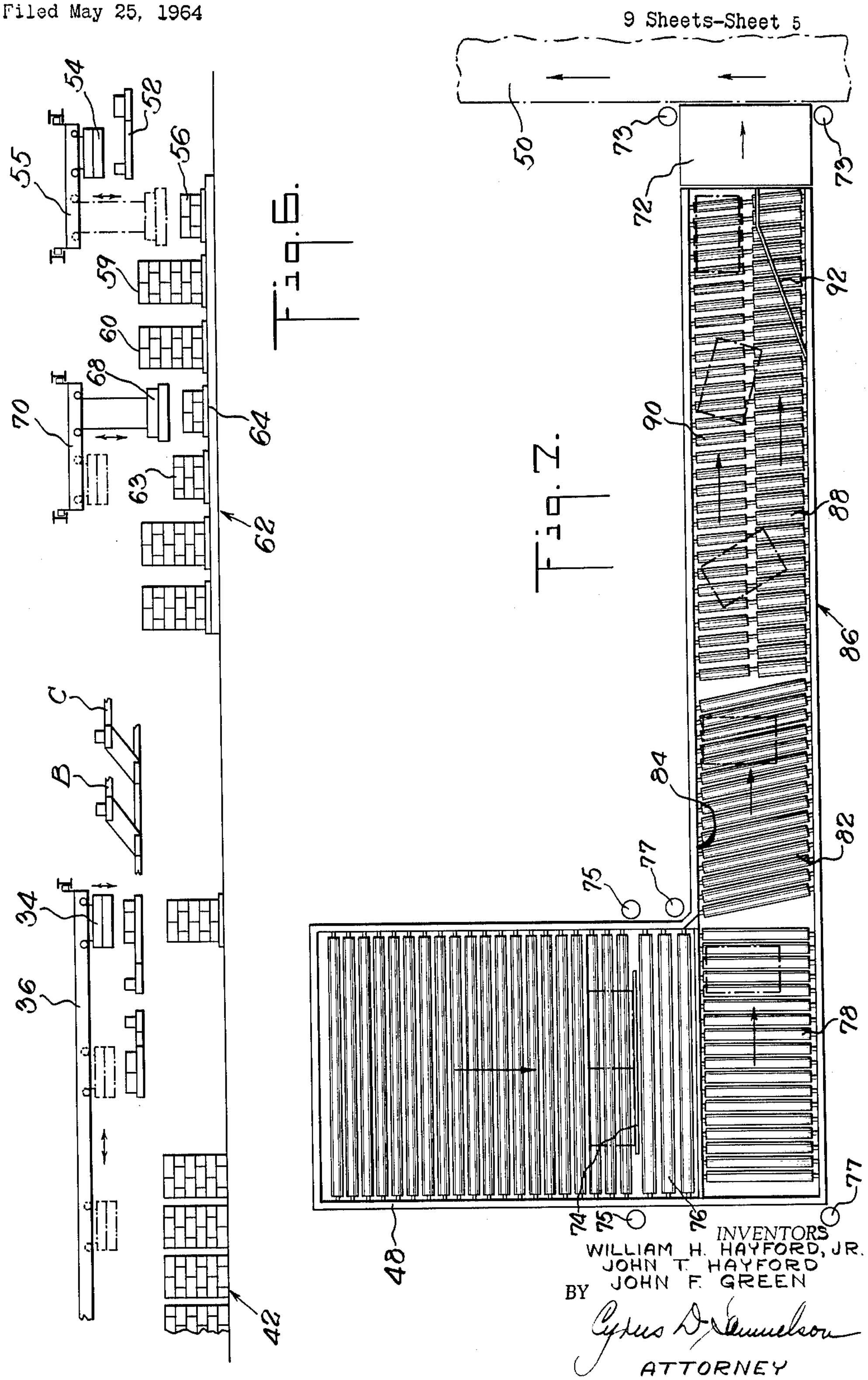
FIGURE 6 is a diagrammatic elevational view seen in the direction of arrows 6 of FIGURE 2.
FIGURE 7 is an enlarged plan view of the skewed roller conveyor of the invention used to orient and position cases fed from a tier unscrambler to a case conveyor.

Tier lots of product are transferred to a pallet on conveyor 64 from a pallet in row 63 by means of suction lift 68 which moves on overhead track 70 (FIGURE 6). On demand, tier lots of product are transferred to a pallet on conveyor 64. It can readily be seen that pallet loads of mixed products or one product may readily be formed on conveyor 64. The filled pallets are indexed forward on conveyor 64 to the output zone.

Figure 5:
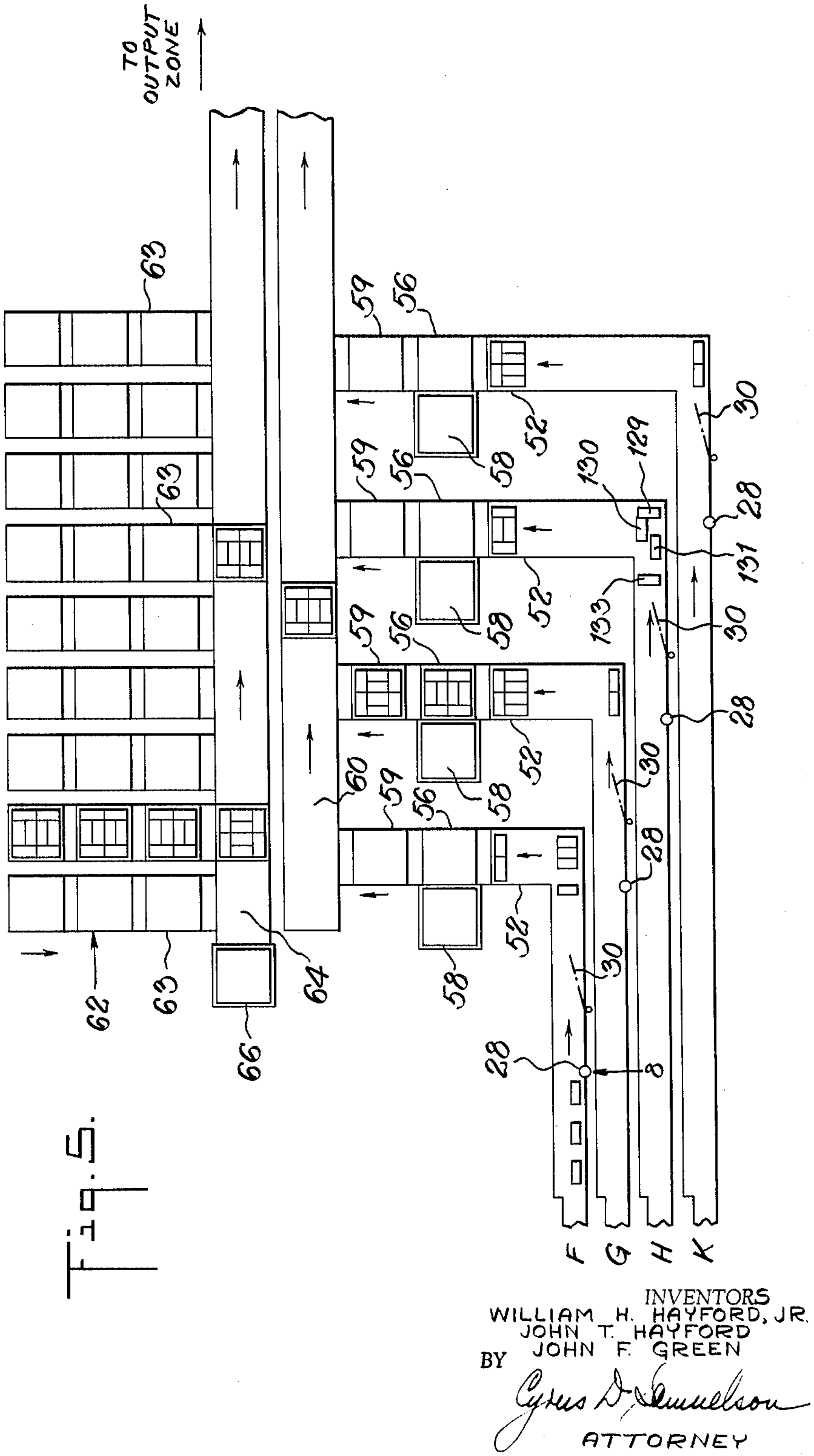
FIGURE 5 is a diagrammatic plan view showing a plurality of pallet forming stations, the pallet storage area and two pallet conveyors.

When a pallet in row 63 is empty, it is removed from the row by automatic means (not shown) and the pallets in that column are indexed forward in the direction of the arrow of FIGURE 5 until a loaded pallet having some products on it occupies a position in row 63.

A plan view of the conveyor used in conjunction with each unscrambling table 48 is shown in FIGURE 7. During the course of the description of this portion of the invention, certain particular values of conveyor velocities and angles of operation will be set forth by way of example. These particular values are not to be considered as limitations of the scope of the invention but are given to show the relative movement of various elements with respect to each other and to simplify the explanation of the function and operation of these elements with respect to the overall operation and construction of the invention.

A tier of cases is placed on the unscrambling table 48 by suction lift 34. The powered rollers in this table 48 run intermittently at a velocity of 40 feet per minute. The movement of the entire tier lot on conveyor 48 is halted by stop 74 which is raised for this purpose. When the programming calls for the row of cases resting against stop 74 to be moved, the stop 74 is dropped and the cases are moved onto conveyor 76 which runs continuously at a velocity of about 160 feet per minute. This much faster velocity throws the leading cases onto conveyor 78. As soon as the leading row of cases clears stop 74, stop 74 is raised and conveyor 48 is stopped to prevent any further cases on conveyor 48 from being moved onto conveyor 76.

Conveyor 78 runs continuously at about 75 feet per minute and conveyor 82 runs continuously at about 150 feet per minute so that the cases fed from conveyor 78 to conveyor 82 are spread out.

The individual rollers of conveyor 82 are preferably of bare steel and are skewed at an angle of about 10° to the normal to the direction of motion of cases on the conveyor. The ends of the rollers which are forward of the normal through the center of the roller are referred to as the leading ends and those which are behind are referred to as the trailing ends. As the cases move along conveyor 82 they are urged, because of the skew angle of the rollers, against rail 84. The cases now leave skewed conveyor 82 and enter split skewed conveyor 86. Split skewed conveyor 86 comprises two skewed sections 88 and 90 both of whose rollers are skewed in the same direction and whose skew angles are approximately 6.5° to the normal. Section 88 runs continuously at a velocity of about 200 feet per minute and each roller is of the lagged type, being preferably formed of steel to which belting material is glued, riveted, or otherwise affixed.

Section 90 runs continuously at a velocity of about 150 feet per minute and is preferably formed of steel rollers of approximately the same diameter as the steel portion of the rollers of section 88. Thus the outside diameter of the rollers of sections 88 is greater than that of the rollers of section 90. This greater roller diameter, the greater friction of the rollers of section 88 and the higher speed of section 88 cause cases which enter conveyor 86 with their long dimensions transverse to the direction of motion of the conveyor (transversely oriented) to be rotated 90° so that their long dimensions are parallel to the imparted direction of motion of the conveyor (longitudinally oriented).

Cases, whose long dimensions are parallel to the direction of motion of conveyor 86 when they enter onto section 90, are not rotated by the action of skewed section 88. Fixed deflection plate 92 is placed at the end of skewed conveyor 86 to push over any cases which have not been urged against rail 84 in conveyor 86 by the skew angle oi conveyor 86 and/or whose long dimensions are not fully parallel to the direction of motion of conveyor section 90 or which are not completely off conveyor section 88. FIGURE 7 shows the manner and direction in which transversely oriented cases are rotated to longitudinal orientation by the action of skewed conveyor 86.

Conveyor 72 is a belt conveyor that runs intermittently at about 150 feet per minute. When an entire tier lot is to be discharged into conveyor 50, conveyor 72 runs continuously. When a single case or a discrete number of cases less than a full tier lot is called for, conveyor 72 runs only long enough to discharge the called-for number of cases and then stops. The counting is accomplished by a photoelectric cell and associated detector located at points 73 or by other suitable means. The operation of stop 74 is controlled by the presence of cases on conveyor 72 and the program involved.

Operation of the tier unscrambling system of the invention proceeds as follows: cases are deposited on unscrambling table 48 by suction lift 34 so that the first line rests against stop 74. Upon demand, stop 74 drops, lets the first row of cases onto conveyor 76 and rises to stop any further case movement onto conveyor 76. A photoelectric cell and an associated detector located at points 75 notify stop 74 when to rise. Conveyor 76 throws the cases on it onto conveyor 78. When cases clear conveyor 78, a photoelectric cell and an associated detector located at points 77 notify stop 74 that conveyor 78 is ready to accept another row of cases. Conveyor 82 moves at a higher speed than conveyor 78 and serves to spread out the spacing between cases. At the same time, the cases are urged against rail 84 because of the skewed rollers of conveyor 82. The cases next enter onto conveyor 86.

If the cases are oriented so that they are transversely oriented on the conveyor, they are rotated by conveyor 86 so that their long dimensions are parallel to the direction of motion of the conveyor (longitudinally oriented) and are urged against rail 84 in conveyor 86. Cases, whose long dimensions are parallel to the direction of the motion of the conveyor, are not reoriented by the action of the split skewed conveyor but merely proceed along section 90 while being urged against rail 84 of conveyor 86. If a longitudinally oriented case is on both sections 88 and 90 when it enters conveyor 86, it is pushed against rail 84 in section 90 by the action of the skewed rollers. The cases then enter belt conveyor 72 which runs intermittently and delivers the present number of cases to conveyor 50.

Thus it can be seen that tier lots, which are placed on unscrambling table 48, are processed by the skewed conveyor of the invention and delivered to conveyor 50 in individual case lots or multiples thereof. Since there are several unscrambling tables 48 in the system, it can readily be seen that an almost infinite number of combinations of case lots and/or tier lots may be delivered to conveyor 50 for transfer to the output zone.

Each conveyor of the system, which is used to feed a tier forming table, is provided with a turning post 28. Turning post 28 is used to control the orientation of the cases passing it so that the tiers are formed in the desired manner as set by the programming of the system. The turning post may permit the cases to pass with their orientation unchanged (first condition) or may change the orientation of the cases passing it by 90° (second condition). Thus, the turning post can either change a case which is transversely oriented with respect to the conveyor's direction of motion to longitudinal orientation or leave the case transversely oriented. It can also leave a case which is longitudinally oriented in its original orientation or change it to transverse orientation.

Figure 8:
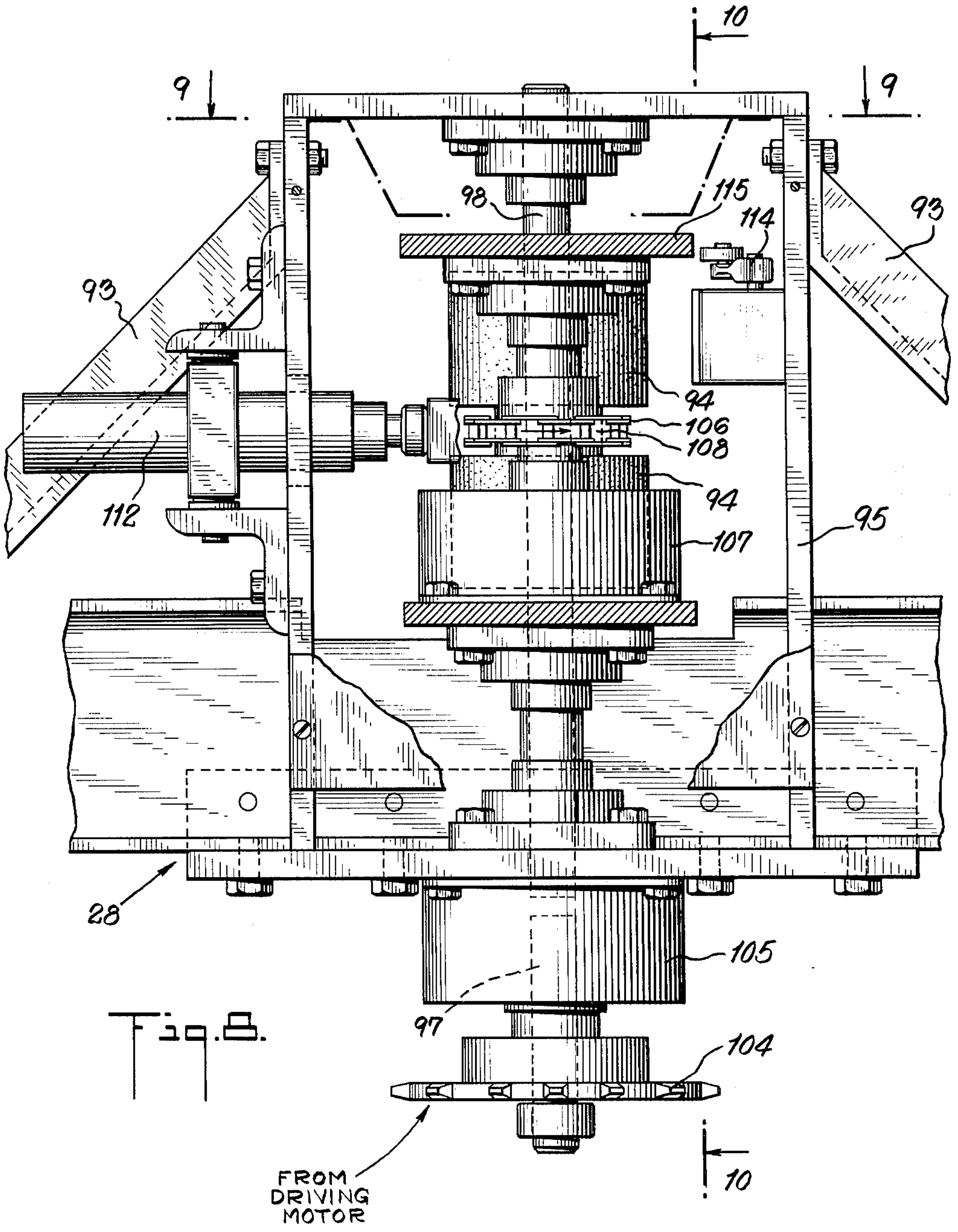
FIGURE 8 is an enlarged rear elevational view, partly broken away, of the turning post of the invention, viewed in the direction of arrow 8 of FIGURE 5.
Figure 8:
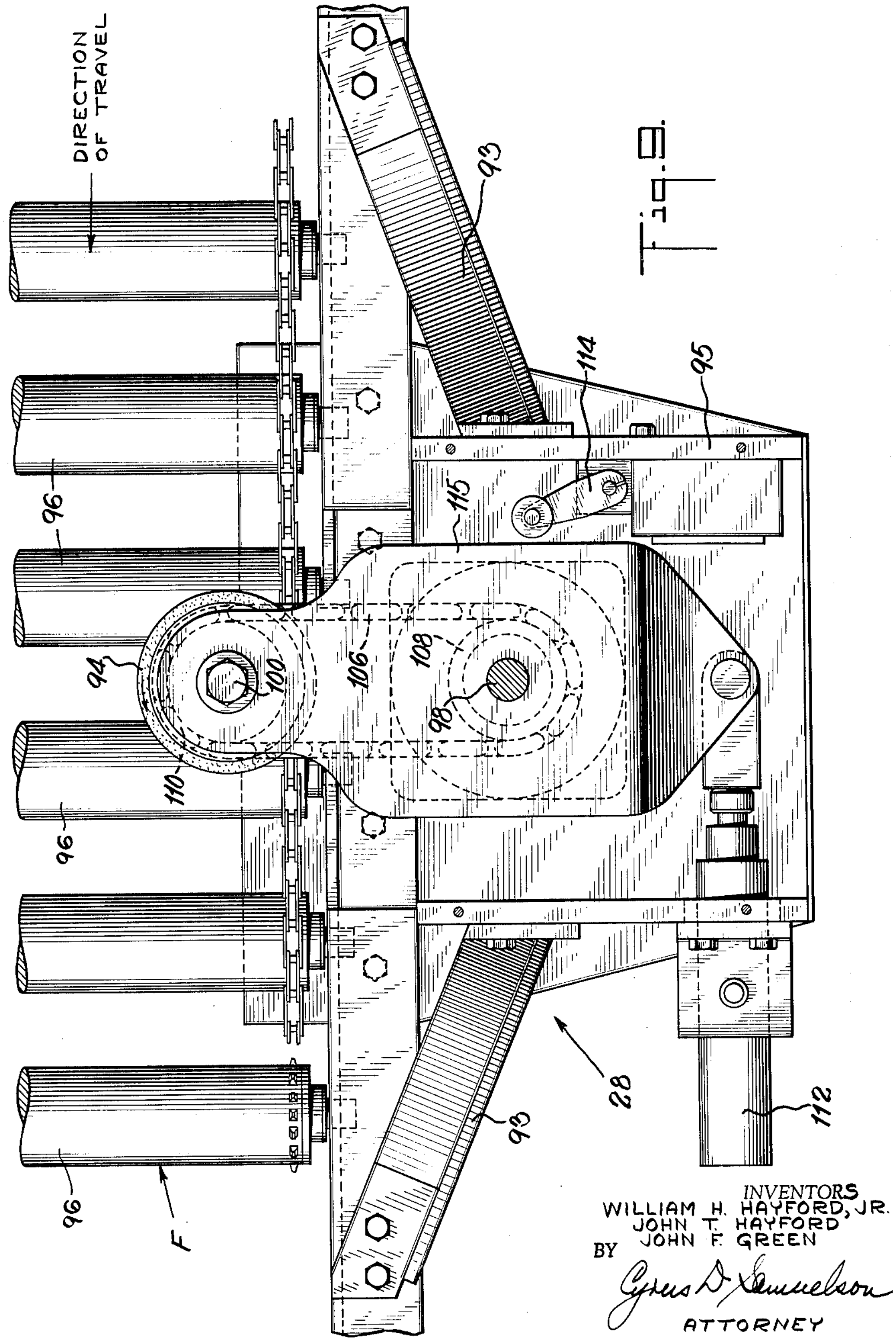
Figure 10:
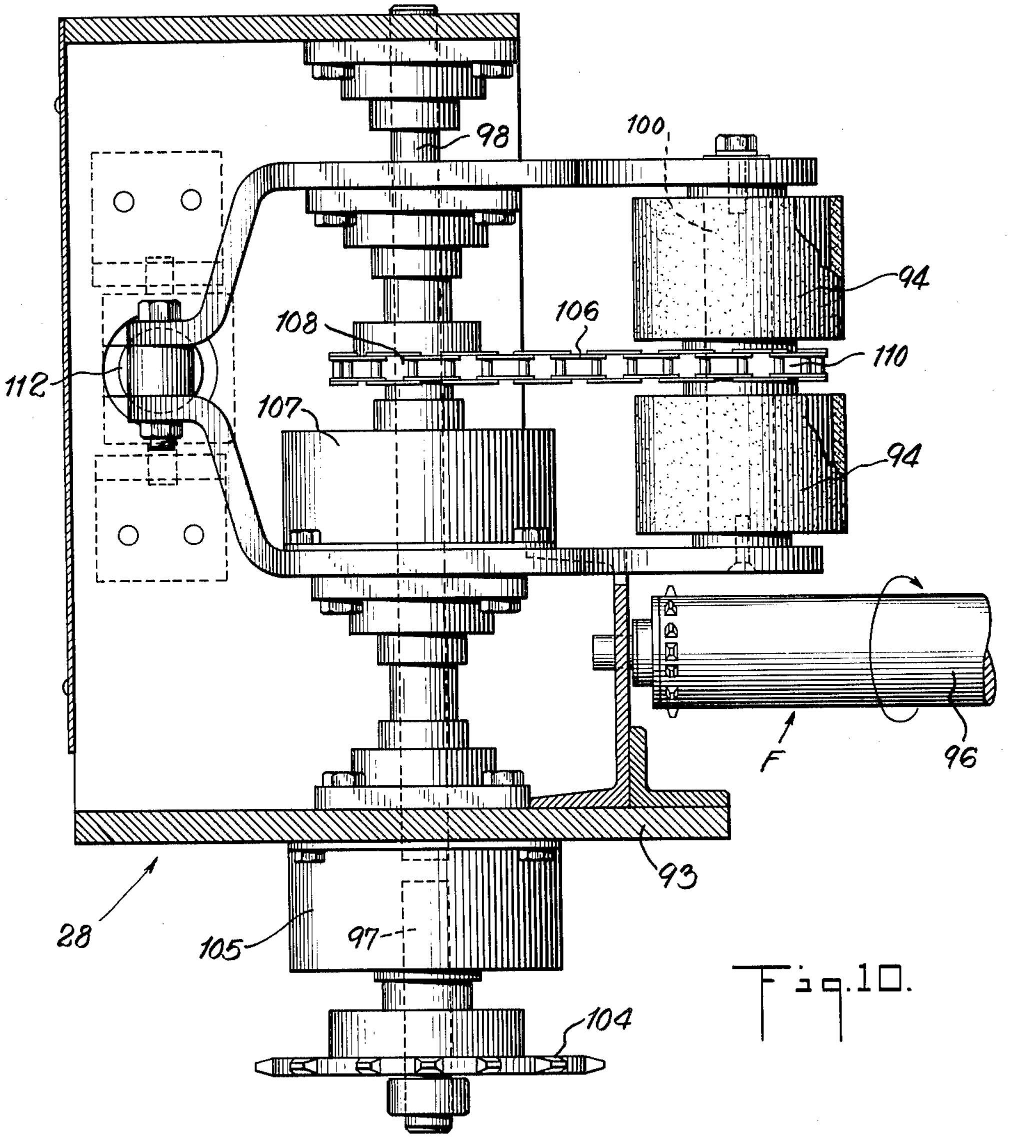
FIGURE 10 is a vertical sectional view, taken along the lines 10—10 of FIGURE 8, viewed in the direction of the arrows.

In FIGURE 8 there is illustrated a rear elevational view, partly broken away, of turning post 28, viewed in the direction of arrow 8 of FIGURE 5. FIGURES 9 and 10 are sectional views respectively taken on the lines 9—9 and 10—10 of FIGURE 8. Frame 95 of turning post 28 is mounted to the side of the conveyor by means of brackets 93 so that rollers 94 overhang the edges of the conveyor rollers to enable the cases which are moving along close to that edge of the conveyor to make contact with the rollers 94. In order to obtain sufficient friction, rollers 94 are of the lagged type; being formed of steel to which belting material is glued, riveted, or otherwise affixed.

The turning post is driven so that the ratio of the linear speed of the conveyor to that imparted to the case by the circumferential movement of the turning post roller is of the order of 1.6 to 1. If the ratio is much higher or much lower than this value, the cases hitting the turning post will be skewed to some orientation other than the transverse or longitudinal orientation. The points at which skewing starts to occur is a function of the size and weight of the case.

When it is desired that the case should maintain its orientation with respect to the conveyor motion, the turning post rollers 94 rotate so that the case is carried around the turning post without any change in orientation. When it is desired that the case be rotated 90° during its passage past the turning post, then the turning post rollers 94 are held stationary and the case is rotated through 90°. This rotation is accomplished because the end of the case contacting the turning post rollers is used as a pivot and the conveyor rollers carry the rear portion of the case around through an angle of approximately 90°. The end of the case then leaves contact with the turning post and proceeds along the conveyor.

In the particular preferred embodiment of turning post illustrated in the figures, the driving means is running all the time that the system's conveyors are running and its actuation is carried on at some point not shown in the figures. The driving means drives shaft 97 by means of a drive chain (not shown) and drive sprocket 104. Shaft 97 rotates continuously and extends into clutch coupling 105. Shaft 98 continues from clutch coupling 105 into brake 107. Shaft 98 rotates when clutch 105 is engaged and brake 107 is disengaged. Shaft 98 is held from turning when brake 107 is engaged and clutch 105 is disengaged. Sprocket 108 is mounted to shaft 98 and is coupled by means of chain 106 to sprocket 110, which is mounted on shaft 100 and coupled to rollers 94, so that rollers 94, which are mounted on shaft 100, rotate when shaft 98 rotates. Brake 107 and clutch 105 are programmed so that one becomes engaged when the other becomes disengaged. It is also within the contemplation of the invention to program the operation of the driving means and turn it on and off as desired or to provide the driving means with a brake to prevent rotation of shaft 98 as programmed and desired. Both brake 107 and clutch 105 are of the types which are commonly known and used in the art and their details are not shown.

When a case, to be turned, moving along the conveyor contacts the rollers 94, the assembly is moved about shaft 98 as a pivot so that rollers 94 are moved in the direction of travel of the conveyor. If the blow struck by the case is very hard and succeeds in compressing the cushioning spring within air cylinder 112 to the extent that assembly frame 115 pivots sufficiently so as to make contact with switch 114, air is applied to the front end of air cylinder 112 and the rollers 94 and the assembly snap back to their normal positions in which rollers 94 overhang the conveyor edge. This snap action of the turning post in returning to its normal position aids in the rotation of the case. Air cylinder 112 is electrically operated in the manner that is well-known in the art and its constructional details are not shown. Other position restoring means and controls therefor may also be used in conjunction with the turning post of the invention.

The operation of the turning post 28 of the invention is programmed in accordance with the desired tier formation and the rollers 94 are caused to rotate when no change in case orientation is desired and are held from rotation when a 90° change in case orientation is desired.

Figures 11, 12:
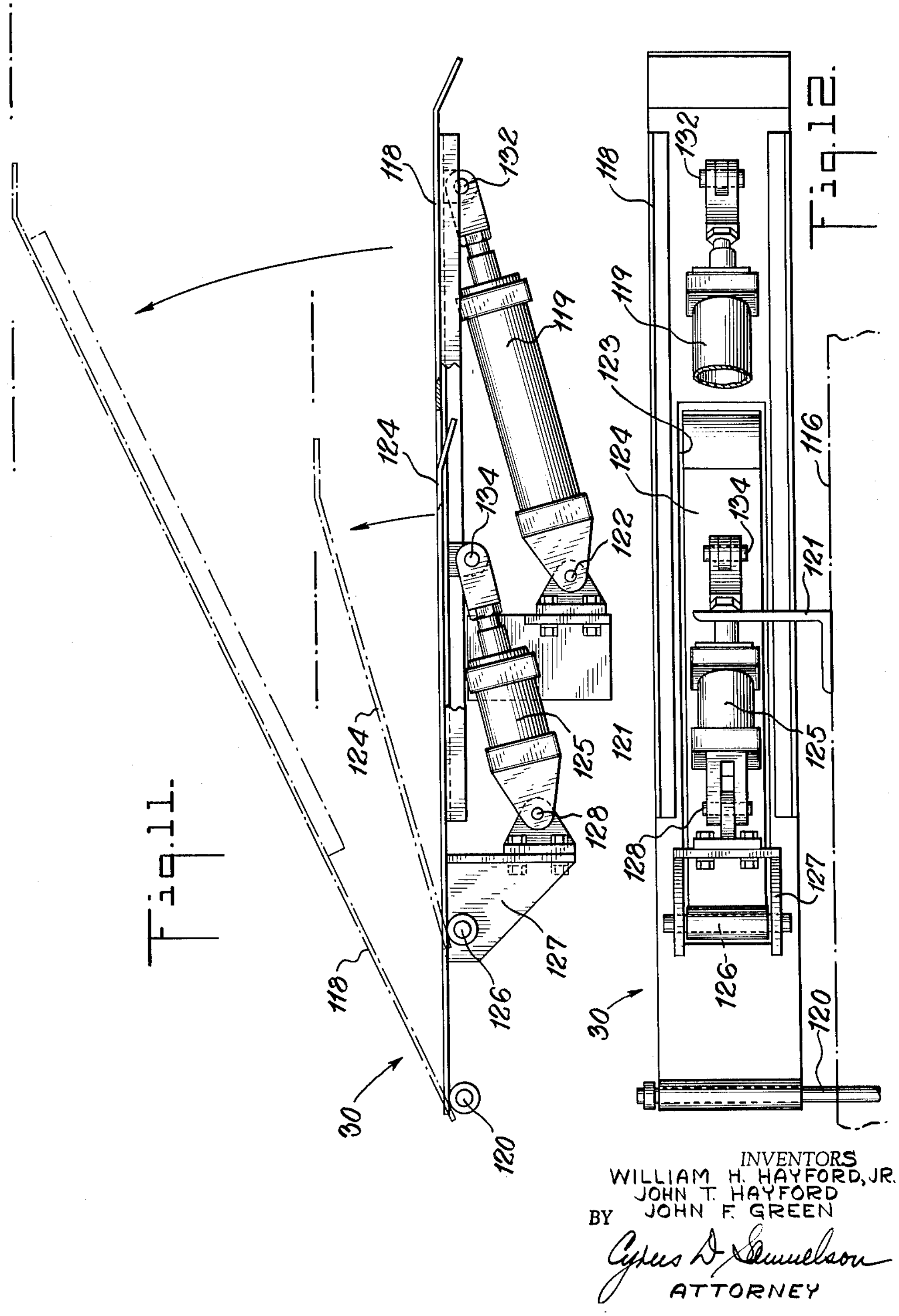
FIGURE 11 is a plan view, partly broken away, of the deflector of the invention.
FIGURE 12 is a side elevational view of the deflector of FIGURE 11.

In tier forming operations, the cases must form certain preset patterns. Consider the tier forming table 52 of line H (FIGURE 5). Four cases have been formed and four more are in the process of being formed prior to being pushed forward on tier forming table 52 and subsequent removal by suction head 54. It has been found that in some instances case 130 will pivot around previously entered case 129. To prevent this, case 129 must be oriented forward. Similarly, case 130 must be oriented forward in order to permit the free access of case 131. To attain this end, the deflector 30 of FIGURES 11 and 12 is used. The deflector moves out over the conveyor to either of two positions. In the first position a transversely oriented case is acted upon and in the second position a longitudinally oriented case is acted upon. If desired, the deflector may be constructed to be moved into more than two positions over the conveyor. The deflector 30 is not brought to bear on case 131 and case 133. Case 129 is oriented forward by means of blade 124 (first position) and case 130 is oriented forward by conveyor blade 118 (second position).

Deflector 30 is mounted to conveyor frame 116 by means of bracket 121 and pivot pin 120. The blades 118 and 124 of deflector 30 are preferably in the same plane as the conveyor guide rail. Large deflector blade 118 pivots around pivot pin 120 as shown in FIGURE 11. Deflector blade 118 is caused to move outward over the conveyor to the dotted position of FIGURE 11 by the action of electrically controlled, air cylinder 119. When air cylinder 119 is actuated, its piston moves outward pushing deflector blade 118 to which it is tied at point 132 so as to cause the deflector blade 118 to pivot around pivot pin 120. The other end of the air cylinder is pivoted to bracket 121 at point 122 to enable the air cylinder to move the deflector blade to its desired position.

Deflector blade 118 is provided with opening 123 through which deflector blade 124 may be pivoted out over the conveyor. Deflector blade 124 and its associated air cylinder 125 is pivoted to deflector blade 118 so that when air cylinder 119 is actuated, deflector blade 124 moves together and in the same plane as deflector blade 118. Bracket 127 is employed to mount air cylinder 125 and pivot pin 126 to deflector blade 118. Air cylinder 125 is tied to deflector blade 124 at point 134 and pivots around point 128 on bracket 127. When electrically operated, air cylinder 125 is actuated, its piston moves outward pushing deflector blade 124 to which it is tied at point 134 through opening 123 in deflector blade 118 and causing deflector blade 124 to pivot around pivot pin 126. Thus, it can be seen that the cases which are longitudinally oriented may be moved transversely to a new orientation on the conveyor by means of deflector blade 118 and the transversely oriented cases may also be moved transversely to a new orientation on the conveyor by means of deflector blade 124. Air cylinders 119 and 125 do not normally operate simultaneously. Under certain conditions, if desired, they can be arranged to do so.

Operation of the deflector 30 of the invention is controlled by a counter, photoelectric cell and associated detector or a similar device located near the deflector. Or, in the particular arrangement used in the invention wherein the turning post and the deflector are located close together, the deflector may be controlled by the same control as is used to control the operation of the turning post.

As we have seen, the overall system operation is controlled by the controlling means which is programmed to route specific cases or groups of cases straight through to the output zone, or to a single conveyor handling mixed loads, or to separate conveyors handling single product loads. Products on the single conveyor can be formed into pallet loads for pallet storage, may be delivered to the output zone as pallet loads of single product or mixed products or may be stored in the dense storage area. Loads from the dense storage area may be delivered to the output zone in tier lots or case lots of a single product or of several products and loads from the pallet storage area may be delivered in pallet loads of a single product or of several products.

As various changes could be made in the above construction without departing from the scope of the invention, it is intended that all matter contained in the above description or shown in the accompanying drawings shall be interpreted as illustrative and not in a limiting sense.

What is claimed is:

1. An article distribution and storage system for handling articles of more than one type supplied to it from an input zone and, in accordance with a predetermined plan, distributing, storing and delivering desired quantities of the articles to storage areas and to an output zone comprising:
   - means for delivering a plurality of types of articles from the input zone to the system;
   - means for controlling the routing of the plurality of types of articles delivered to the system from the input zone in a plurality of alternative ways;
   - a dense storage area;
   - a pallet storage area;
   - at least one palletizing station;
   - at least one tier forming station;
   - at least one unscrambling station for unscrambling tier lots of the articles into case lots;
   - means actuated by the controlling means for forming tiers of articles of a predetermined constitution at the tier forming station;
   - means for moving the formed tiers of articles to a pallet to form a pallet load;
   - means for delivering the pallet loads to the pallet storage area;
   - means actuated by the controlling means for delivering predetermined types and numbers of articles from the input zone through the system to the output zone;

at least one pallet conveyor adapted to deliver pallet loads to the output zone;

means actuated by the controlling means for forming pallet loads on the pallet conveyor of a predetermined type and number for delivery to the output zone;

means actuated by the controlling means for delivering tier lots of a given type and number to particular stations in the dense storage area;

means actuated by the controlling means for delivering tier lots of a given type and number from particular stations in the dense storage area to the unscrambling station;

means for delivering the case lots unscrambled at the unscrambling station to the output zone; and means actuated by the controlling means for delivering a plurality of a given number of pallet loads, each containing product from a single product line, to the output zone.

2. An article distribution and storage system as described in claim 1 including at least one conveyor feeding the tier forming station and a turning post for leaving the orientation of the passing cases unaltered in a first condition and for rotating the orientation of the passing cases by 90° in a second condition mounted at the edge of the conveyor;

the turning post comprising:

a frame mounted to the conveyor at one edge thereof;

a rotatable roller mounted in the frame overhanging the conveyor edge such that the cases moving on the conveyor contact the roller and placed so that when it rotates the linear motion imparted to the case is parallel to the direction of travel of the conveyor;

driving means for rotating the rotatable roller; and means for controlling the driving means such that the roller is rotated to leave the orientation of passing cases unaltered and is held from rotation to change the orientation of passing cases by 90°.

3. An article distribution and storage system as described in claim 1 including at least one conveyor feeding the tier forming station and a turning post for leaving the orientation of the passing cases unaltered in a first condition and for rotating the orientation of the passing cases by 90° in a second condition mounted at the edge of the conveyor;

the turning post comprising:

a frame mounted to the conveyor at one edge thereof;

a rotatable roller mounted in the frame overhanging the conveyor edge such that the cases moving on the conveyor contact the roller and placed so that when it rotates the linear motion imparted to the case is parallel to the motion of the conveyor;

a shaft mounted in the frame coupled to the rotatable roller such that the roller is rotated when the shaft is rotated;

a clutch mounted in the frame for coupling the driving means to and uncoupling the driving means from the shaft;

a brake mounted in the frame so as to act on the shaft; and means for controlling the clutch and brake such that the shaft is rotated to leave the orientation of passing cases unaltered and is held from rotation to change the orientation of passing cases by 90°.

4. An article distribution and storage system as described in claim 1 wherein the unscrambling station comprises:

a conveyor table for receiving a tier lot of cases;

a first conveyor onto which cases from the conveyor table are moved;

means for controlling the number of cases delivered from the conveyor table to the first conveyor;

a second conveyor onto which cases from the first conveyor are moved;

a first skewed conveyor, the rollers of which make an acute angle with the normal to the direction of movement of the cases on the conveyor so that the cases on the conveyor are urged toward the side of the conveyor at which the trailing ends of the skewed rollers are mounted;

a second skewed conveyor onto which the cases from the first skewed conveyor are moved;

the second skewed conveyor comprising:

two skewed conveyor sections in side by side relationship, whose rollers are skewed in the same direction;

the skewed conveyor section adjacent the trailing end of the skewed rollers moving at a lower velocity than the other skewed conveyor section to force transversely oriented cases to be rotated to longitudinal orientation and to urge all the cases toward the side of the conveyor at which the trailing ends of the skewed rollers are mounted.

5. An article distribution and storage system as described in claim 1 wherein the unscrambling station comprises:

a first skewed conveyor, the rollers of which make an acute angle with the normal to the direction of movement of the cases on the conveyor so that the cases are urged toward the side of the conveyor at which the trailing ends of the skewed rollers are mounted; and a second skewed conveyor onto which the cases from the first skewed conveyor are moved;

the second skewed conveyor comprising:

two skewed conveyor sections in side by side relationship, whose rollers are skewed in the same direction;

the skewed conveyor section adjacent the trailing end of the skewed rollers moving at a lower velocity than the other skewed conveyor section to force transversely oriented cases to be rotated to longitudinal orientation and to urge all the cases toward the side of the conveyor at which the trailing ends of the skewed rollers are mounted.

6. An article distribution and storage system as described in claim 1 including at least one conveyor feeding at least one tier forming station and a deflector for urging selected cases toward the opposite side of the conveyor mounted at one side of the conveyor;

the deflector comprising:

a long deflector blade having an opening therein pivoted to the frame at one side of the conveyor so as to rest along the side of the conveyor and to be movable over the conveyor;

means for moving the long deflector blade over the conveyor to cause the long deflector blade to act on a selected longitudinally oriented case to urge the case toward the opposite side of the conveyor;

a short pivoted deflector blade adapted to fit through the opening in the long deflector blade resting along the side of the conveyor and movable over the conveyor; and means for moving the short deflector blade over the conveyor to cause the short deflector blade to act on a selected transversely oriented case to urge the case toward the opposite side of the conveyor.

7. An article distribution and storage system as described in claim 1 including at least one conveyor feeding at least one tier forming station and a deflector for urging selected cases toward the opposite side of the conveyor mounted at one side of the conveyor;

the deflector comprising:

a long deflector blade having an opening therein pivoted to the frame at one side of the conveyor so as to rest along the side of the conveyor and to be movable over the conveyor;

means for moving the long deflector blade over the conveyor to cause the long deflector blade to act on a selected longitudinally oriented case to urge the case toward the opposite side of the conveyor;

a short pivoted deflector blade adapted to fit through the opening in the long deflector blade resting along the side of the conveyor and movable over the conveyor;

means for moving the short deflector blade over the conveyor to cause the short deflector blade to act on a selected transversely oriented case to urge the case toward the opposite side of the conveyor;

the short pivoted deflector blade being pivoted to the long deflector blade;

the means for moving the long deflector blade and the means for moving the short deflector blade being electrically controlled air cylinders.

8. An article distribution and storage system as described in claim 2 including a deflector for aligning selected cases toward the opposite side of the conveyor mounted at one side of the conveyor after the turning post;

the deflector comprising:

a long deflector blade having an opening therein pivoted to the frame at one side of the conveyor so as to rest along the side of the conveyor and to be movable over the conveyor;

means for moving the long deflector blade over the conveyor to cause the long deflector blade to act on a selected longitudinally oriented case to urge the case toward the opposite side of the conveyor;

a short pivoted deflector blade adapted to fit through the opening in the long deflector blade resting along the side of the conveyor and movable over the conveyor; and means for moving the short deflector blade over the conveyor to cause the short deflector blade to act on a selected transversely oriented case to urge the case toward the opposite side of the conveyor.

9. An article distribution and storage system as described in claim 2 including a deflector for aligning selected cases toward the opposite side of the conveyor mounted at one side of the conveyor after the turning post;

the deflector comprising:

a long deflector blade having an opening therein pivoted to the frame at one side of the conveyor so as to rest along the side of the conveyor and to be movable over the conveyor;

means for moving the long deflector blade over the conveyor to cause the long deflector blade to act on a selected longitudinally oriented case to urge the case toward the opposite side of the conveyor;

a short pivoted deflector blade adapted to fit through the opening in the long deflector blade resting along the side of the conveyor and movable over the conveyor;

means for moving the short deflector blade over the conveyor to cause the short deflector blade to act on a selected transversely oriented case to urge the case toward the opposite side of the conveyor;

the short pivoted deflector blade being pivoted to the long deflector blade;

the means for moving the long deflector blade and the means for moving the short deflector blade being electrically controlled air cylinders.

10. An article distribution and storage system as described in claim 3 including a deflector for aligning selected cases toward the opposite side of the conveyor mounted at one side of the conveyor after the turning post;

the deflector comprising:

a long deflector blade having an opening therein pivoted to the frame at one side of the conveyor so as to rest along the side of the conveyor and to be movable over the conveyor;

means for moving the long deflector blade over the conveyor to cause the long deflector blade to act on a selected longitudinally oriented case to urge the case toward the opposite side of the conveyor;

a short pivoted deflector blade adapted to fit through the opening in the long deflector blade resting along the side of the conveyor and movable over the conveyor; and means for moving the short deflector blade over the conveyor to cause the short deflector blade to act on a selected transversely oriented case to urge the case toward the opposite side of the conveyor.

11. An article distribution and storage system as described in claim 3 including a deflector for aligning selected cases toward the opposite side of the conveyor mounted at one side of the conveyor after the turning post;

the deflector comprising:

a long deflector blade having an opening therein pivoted to the frame at one side of the conveyor so as to rest along the side of the conveyor and to be movable over the conveyor;

means for moving the long deflector blade over the conveyor to cause the long deflector blade to act on a selected longitudinally oriented case to urge the case toward the opposite side of the conveyor;

a short pivoted deflector blade adapted to fit through the opening in the long deflector blade resting along the side of the conveyor and movable over the conveyor;

means for moving the short deflector blade over the conveyor to cause the short deflector blade to act on a selected transversely oriented case to urge the case toward the opposite side of the conveyor;

the short pivoted deflector blade being pivoted to the long deflector blade;

the means for moving the long deflector blade and the means for moving the short deflector blade being electrically controlled air cylinders.

12. An article distribution and storage system as described in claim 1 including at least one conveyor feeding at least one tier forming station, a turning post for leaving the orientation of the passing cases unaltered in a first condition and for rotating the orientation of the passing cases by 90° in a second condition mounted at the edge of the conveyor, a deflector for urging selected cases toward the opposite side of the conveyor mounted on the conveyor after the turning post;

the unscrambling station comprising:

a conveyor table for receiving a tier lot of cases;

a first conveyor onto which cases from the conveyor table are moved;

means for controlling the number of cases delivered from the conveyor table to the first conveyor;

a second conveyor onto which cases from the first conveyor are moved;

a first skewed conveyor onto which cases from the second conveyor are moved and the rollers of which make an acute angle with the normal to the direction of movement of the cases on the conveyor so that the cases on the conveyor are urged toward the side of the conveyor at which the trailing ends of the skewed rollers are mounted;

a second skewed conveyor onto which the cases from the first skewed conveyor are moved;

the second skewed conveyor comprising:

two skewed conveyor sections in side by side relationship, whose rollers are skewed in the same direction;

the skewed conveyor section adjacent the trailing end of the skewed rollers moving at a lower velocity than the other skewed conveyor section to force transversely oriented cases to be rotated to longitudinal orientation and to urge all the cases toward the side of the conveyor at which the trailing ends of the skewed rollers are mounted;

the turning post comprising:

a frame mounted to the conveyor at one edge thereof;

a rotatable roller mounted in the frame overhanging the conveyor edge such that the cases moving on the conveyor contact the roller and placed so that when it rotates the linear motion imparted to the case is parallel to the motion of the conveyor;

a shaft mounted in the frame coupled to the rotatable roller such that the roller is rotated when the shaft is rotated;

a clutch mounted in the frame for coupling the driving means to and uncoupling the driving means from the shaft;

a brake mounted in the frame so as to act on the shaft;

means for controlling the clutch and brake such that the shaft is rotated to leave the orientation of passing cases unaltered and is held from rotation to change the orientation of passing cases by 90°;

the deflector comprising:

a long deflector blade having an opening therein pivoted to the frame at one side of the conveyor so as to rest along the side of the conveyor and to be movable over the conveyor;

means for moving the long deflector blade over the conveyor to cause the long deflector blade to act on a selected longitudinally oriented case to urge the case toward the opposite side of the conveyor;

a short pivoted deflector blade adapted to fit through the opening in the long deflector blade resting along the side of the conveyor and movable over the conveyor;

means for moving the short deflector blade over the conveyor to cause the short deflector blade to act on a selected transversely oriented case to urge the case toward the opposite side of the conveyor;

the short pivoted deflector blade being pivoted to the long deflector blade;

the means for moving the long deflector blade and the means for moving the short deflector blade being electrically controlled air cylinders.

13. As a part of an article distribution and storage system, a system for unscrambling tier lots of cases into case lots for delivery of complete tier lots, partial tier lots or individual cases, which are longitudinally oriented, to an output zone comprising:

a conveyor table for receiving a tier lot of cases;

a first conveyor onto which cases from the conveyor table are moved;

means for controlling the number of cases delivered from the conveyor table to the first conveyor;

a second conveyor onto which cases from the first conveyor are moved;

a first skewed conveyor onto which cases from the second conveyor are moved and the rollers of which make an acute angle with the normal to the direction of movement of the cases on the conveyor so that the cases on the skewed conveyor are urged toward the side of the conveyor at which the trailing ends of the skewed rollers are mounted;

a second skewed conveyor onto which the cases from the first skewed conveyor are moved;

the second skewed conveyor comprising:

two skewed conveyor sections in side by side relationship, whose rollers are skewed in the same direction;

the skewed conveyor section adjacent the trailing end of the skewed rollers moving at a lower velocity than the other skewed conveyor section to force transversely oriented cases to be rotated to longitudinal orientation and to urge all the cases toward the side of the conveyor at which the trailing ends of the skewed rollers are mounted.

14. As a part of an article distribution and storage system, a conveyor system for longitudinally orienting cases delivered to it and moving the cases toward one side of the conveyor comprising:

a first skewed conveyor, the rollers of which make an acute angle with the normal to the direction of movement of the cases on the conveyor so that the cases are urged toward the side of the conveyor at which the trailing ends of the skewed rollers are mounted; and a second skewed conveyor onto which the cases from the first skewed conveyor are moved;

the second skewed conveyor comprising:

two skewed conveyor sections in side by side relationship, whose rollers are skewed in the same direction;

the skewed conveyor section adjacent the trailing end of the skewed rollers moving at a lower velocity than the other skewed conveyor section to force transversely oriented cases to be rotated to longitudinal orientation and to urge all the cases toward the side of the conveyor at which the trailing ends of the skewed rollers are mounted.

15. As a part of an article distribution and storage system, a conveyor system for longitudinally orienting cases delivered to it and moving the cases toward one side of the conveyor comprising:

two skewed conveyor sections in side by side relationship whose rollers are skewed in the same direction and make an acute angle with the normal to the direction of movement of the cases on the conveyor;

the skewed conveyor section adjacent the trailing end of the skewed rollers moving at a lower velocity than the other skewed conveyor section to force transversely oriented cases to be rotated to longitudinal orientation and to urge all the cases toward the side of the conveyor at which the trailing ends of the skewed rollers are mounted.

16. A conveyor system as described in claim 15 wherein the surfaces of the rollers of the skewed conveyor section moving at the higher velocity are covered with a material presenting greater friction to the cases than do the surfaces of the rollers of the other skewed conveyor section.

17. A conveyor system as described in claim 14 wherein the surfaces of the rollers of the skewed conveyor section moving at the higher velocity are covered with a material presenting greater friction to the cases than do the surfaces of the rollers of the other skewed conveyor section.

18. A conveyor system as described in claim 13 wherein the surfaces of the rollers of the skewed conveyor section moving at the higher velocity are covered with a material presenting greater friction to the cases than do the surfaces of the rollers of the other skewed conveyor section.

19. As a part of an article distribution and storage system, a turning post for mounting at the edge of a conveyor for leaving the orientation of the passing cases unaltered in a first condition and for rotating the orientation of the passing cases 90° in a second condition comprising:

a frame mounted to the conveyor at one edge thereof;
a rotatable roller mounted in the frame overhanging the conveyor edge such that the cases moving on the conveyor contact the roller and placed so that when it rotates the linear motion imparted to the case is parallel to the motion of the conveyor;
driving means for rotating the rotatable roller; and
means for controlling the driving means such that the roller is rotated to leave the orientation of passing cases unaltered and is held from rotation to change the orientation of passing cases by 90°.

20. As a part of an article distribution and storage system, a turning post for mounting at the edge of a conveyor for leaving the orientation of the passing cases unaltered in a first condition and for rotating the orientation of the passing cases 90° in a second condition comprising:

a frame mounted to the conveyor at one edge thereof;
a rotatable roller mounted in the frame overhanging the conveyor edge such that the cases moving on the conveyor contact the roller and placed so that when it rotates the linear motion imparted to the case is parallel to the motion of the conveyor;
a shaft mounted in the frame coupled to the rotatable roller such that the roller is rotated when the shaft is rotated;
driving means;
means for coupling the driving means to the shaft for rotating the shaft;
means for controlling the coupling means such that the shaft is rotated to leave the orientation of passing cases unaltered and is held from rotation to change the orientation of passing cases by 90°.

21. As a part of an article distribution and storage system, a turning post for mounting at the edge of a conveyor for leaving the orientation of the passing cases unaltered in a first condition and for rotating the orientation of the passing cases 90° in a second condition comprising:

a frame mounted to the conveyor at one edge thereof;
a rotatable roller mounted in the frame overhanging the conveyor edge such that the cases moving on the conveyor contact the roller and placed so that when it rotates the linear motion imparted to the case is parallel to the motion of the conveyor;
a shaft mounted in the frame coupled to the rotatable roller such that the roller is rotated when the shaft is rotated;
driving means;
a clutch mounted in the frame for coupling the driving means to and uncoupling the driving means from the shaft;
means for controlling the clutch such that the shaft is rotated to leave the orientation of passing cases unaltered and is held from rotation to change the orientation of passing cases by 90°.

22. As a part of an article distribution and storage system, a turning post for mounting at the edge of a conveyor for leaving the orientation of the passing cases unaltered in a first condition and for rotating the orientation of the passing cases 90° in a second condition comprising:

a frame mounted to the conveyor at one edge thereof;
a rotatable roller mounted in the frame overhanging the conveyor edge such that the cases moving on the conveyor contact the roller and placed so that when it rotates the linear motion imparted to the case is parallel to the motion of the conveyor;
a shaft mounted in the frame coupled to the rotatable roller such that the roller is rotated when the shaft is rotated;
driving means coupled to the shaft for rotating the shaft;
a brake mounted in the frame so as to act on the shaft;
means for controlling the brake such that the shaft is rotated to leave the orientation of passing cases unaltered and is held from rotation to change the orientation of passing cases by 90°.

23. As a part of an article distribution and storage system, a turning post for mounting at the edge of a conveyor for leaving the orientation of the passing cases unaltered in a first condition and for rotating the orientation of the passing cases 90° in a second condition comprising:

a frame mounted to the conveyor at one edge thereof;
a rotatable roller mounted in the frame overhanging the conveyor edge such that the cases moving on the conveyor contact the roller and placed so that when it rotates the linear motion imparted to the case is parallel to the motion of the conveyor;
a shaft mounted in the frame coupled to the rotatable roller such that the roller is rotated when the shaft is rotated;
a clutch mounted in the frame for coupling the driving means to and uncoupling the driving means from the shaft;
a brake mounted in the frame so as to act on the shaft;
means for controlling the clutch and brake such that the shaft is rotated to leave the orientation of passing cases unaltered and is held from rotation to change the orientation of passing cases by 90°.

24. As a part of an article distribution and storage system, a deflector for aligning selected cases toward the opposite side of a conveyor comprising:

a long deflector blade having an opening therein pivoted to the frame at one side of the conveyor so as to rest along the side of the conveyor and to be movable over the conveyor;
means for moving the long deflector blade over the conveyor to cause the long deflector blade to act on a selected longitudinally oriented case to urge the case toward the opposite side of the conveyor;
a short pivoted deflector blade adapted to fit through the opening in the long deflector blade resting along the side of the conveyor and movable over the conveyor; and
means for moving the short deflector blade over the conveyor to cause the short deflector blade to act on a selected transversely oriented case to urge the case toward the opposite side of the conveyor.

25. As a part of an article distribution and storage system, a deflector for aligning selected cases toward the opposite side of a conveyor comprising:

means pivoted to the frame at one side of the conveyor so as to rest along the side of the conveyor and to be movable to more than one position over the conveyor; and
means for moving the movable means over the conveyor to more than one position so that in the first position the movable means acts on a selected case to urge the case toward the opposite side of the conveyor and in another position the movable means acts on a selected case to urge the case toward the opposite side of the conveyor.

26. A deflector as described in claim 24 wherein the short pivoted deflector blade is pivoted to the long deflector blade.

27. A deflector as described in claim 26 wherein the means for moving the long deflector blade and the means for moving the short deflector blade are electrically controlled air cylinders.

28. A deflector as described in claim 24 wherein the means for moving the long deflector blade and the means for moving the short deflector blade are electrically controlled air cylinders.

29. An article distribution and storage system as described in claim 2 wherein the rotatable roller is pivotable in the direction of travel of the conveyor when struck by a moving case and including position restoring means to bring the rotatable roller to its normal conveyor overhanging position.

30. An article distribution and storage system as described in claim 3 wherein the rotatable roller is pivotable in the direction of travel of the conveyor when struck by a moving case and including position restoring means to bring the rotatable roller to its normal conveyor overhanging position.

31. An article distribution and storage system as described in claim 12 wherein the rotatable roller is pivotable in the direction of travel of the conveyor when struck by a moving case and including position restoring means to bring the rotatable roller to its normal conveyor overhanging position.

32. A turning post as described in claim 19 wherein the rotatable roller is part of an assembly which is pivotably mounted so that the rotatable roller moves in the direction of travel of the conveyor when struck by a moving case and including position restoring means to bring the rotatable roller to its normal conveyor overhanging position.

33. A turning post as described in claim 20 wherein the rotatable roller is part of an assembly which is pivotably mounted so that the rotatable roller moves in the direction of travel of the conveyor when struck by a moving case and including position restoring means to bring the rotatable roller to its normal conveyor overhanging position.

34. A turning post as described in claim 21 wherein the rotatable roller is part of an assembly which is pivotably mounted so that the rotatable roller moves in the direction of travel of the conveyor when struck by a moving case and including position restoring means to bring the rotatable roller to its normal conveyor overhanging position.

35. A turning post as described in claim 22 wherein the rotatable roller is part of an assembly which is pivotably mounted so that the rotatable roller moves in the direction of travel of the conveyor when struck by a moving case and including position restoring means to bring the rotatable roller to its normal conveyor overhanging position.

36. A turning post as described in claim 23 wherein the rotatable roller is part of an assembly which is pivotably mounted so that the rotatable roller moves in the direction of travel of the conveyor when struck by a moving case and including position restoring means to bring the rotatable roller to its normal conveyor overhanging position.

References Cited by the Examiner

UNITED STATES PATENTS

| | | | |
|---|---|---|---|
| 2,716,497 | 8/1955 | Wahl | 214—6 |
| 2,761,542 | 9/1956 | Pagdin | 198—33 |
| 2,963,143 | 12/1960 | Field | 198—33 |
| 2,997,187 | 8/1961 | Burt | 214—6 |

EVON C. BLUNK, *Primary Examiner.*

H. C. HORNSBY, *Assistant Examiner.*